D. GURNSEY.
Milk-Cooler.

No. 161,952.

Patented April 13, 1875.

WITNESSES:
A. Bennerendorf
A. F. Terry

INVENTOR:
D. Gurnsey
BY
ATTORNEYS.

THE GRAPHIC CO.PHOTO.-LITH.39 & 41 PARK PLACE,N.Y.

UNITED STATES PATENT OFFICE.

DANIEL GURNSEY, OF WATERTOWN, NEW YORK.

IMPROVEMENT IN MILK-COOLERS.

Specification forming part of Letters Patent No. 161,952, dated April 13, 1875; application filed February 20, 1875.

*To all whom it may concern:*

Figure 1:
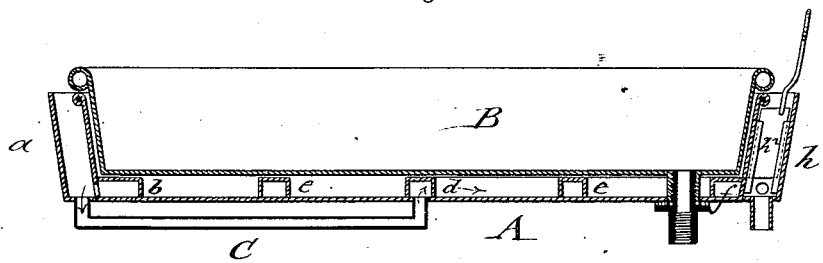
Figure 2:
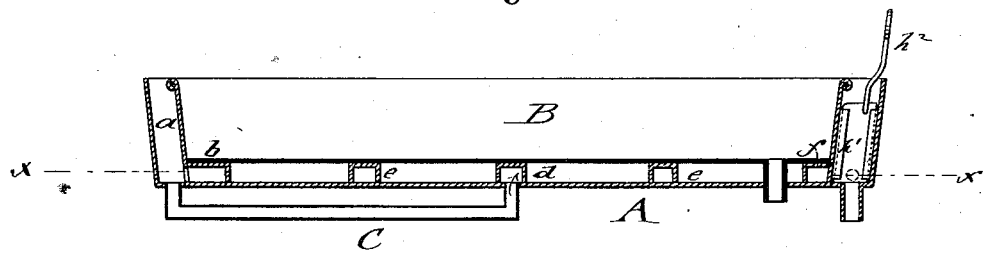
Figure 3:
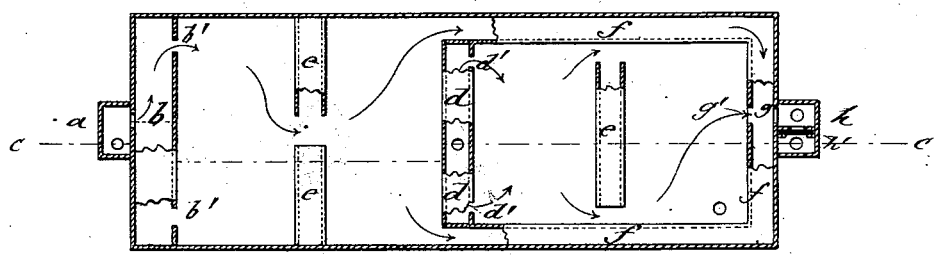

Be it known that I, DANIEL GURNSEY, of Watertown, in the county of Jefferson and State of New York, have invented a new and Improved Milk-Cooler, of which the following is a specification:

In the accompanying drawing, Figures 1 and 2 represent vertical longitudinal sections on the line $cc$, Fig. 3, of my improved milk-cooler—one shown with detachable milk-pan, the other with a bottom attached to vat to form stationary pan; and Fig. 3 is a top view of the same, partly in section on the line $x\,x$, Fig. 2.

Similar letters of reference indicate corresponding parts.

The object of my invention is to obviate the difficulty hitherto experienced in milk-coolers from the unequal distribution and cooling capacity of the water, which enters at one side and is gradually warmed up on its passage through the cooler, so that the temperature at one end of the pan, where the cool water enters, is considerably lower than at the other end. The uneven temperature of the milk retards the process of raising the cream and decreases the yield of butter.

My invention is intended to remedy these defects; and consists of devices for admitting the cool water simultaneously at the end and at central points of the bottom of the cooler, and drawing it off by suitable channels and regulating devices at the opposite end.

In the drawing, A represents a cooling tank or vat, into which a detachable milk-pan, B, is seated, as shown in Fig. 1, or a permanent bottom applied over the cooler to form a stationary pan, as in Fig. 2. The cool water enters through a chamber, $a$, at one end of the pan, into a lateral channel, $b$, and simultaneously by a tube, C, connecting the bottom of chamber $a$ to the center of the pan through a bottom aperture into a lateral channel, $d$, that is closed at both ends. Both channels $b$ and $d$ have side issuing-holes $b'$ and $d'$, through which the cool water floods, at the same time, the sections of the cooler, lateral partitions $e$ serving to break the current and impart a more circuitous passage to the water. The water of the section near the entrance-chamber $a$ is conveyed toward the opposite end by channels $f$, which run along the sides and end wall of the vat, being drawn off by an exit-aperture, $g$. The water in the section cooled by the bottom tube C is conveyed, by an aperture, $g^1$, in the end channel $f$, to the exit-aperture $g^2$, to be there drawn off either directly through a bottom pipe in the end chamber $h$, or by closing the same, to be regulated therein by passing through a hole of a partition, $h^1$, which may be closed by a sliding gate, $h^2$, so that the water may also be made to rise around the sides of the milk-pan to the height of the gate, if desired.

Any suitable regulating mechanism may, however, be employed to draw off the water and keep it at a certain height in the cooler.

Having thus described my invention, I claim as new and desire to secure by Letters Patent—

1. In milk-coolers, the water tank or vat, provided with a bottom tube, connecting the entrance-chamber of the water with any lateral issuing-channel at the central part of the vat, for distributing the cool water simultaneously over separate sections of the same, substantially as shown and described.

2. The end channel $f$ of the vat, provided with aperture $g^1$, for conveying water of section supplied from the central issuing-channel to exit-aperture, as specified.

DANIEL GURNSEY.

Witnesses:
SAMUEL WILSON,
JAMES DAVIDSON.